R. B. DICKINSON.
UTENSIL FOR COOKING RANGES.
APPLICATION FILED JUNE 22, 1904.
902,215.
Patented Oct. 27, 1908.
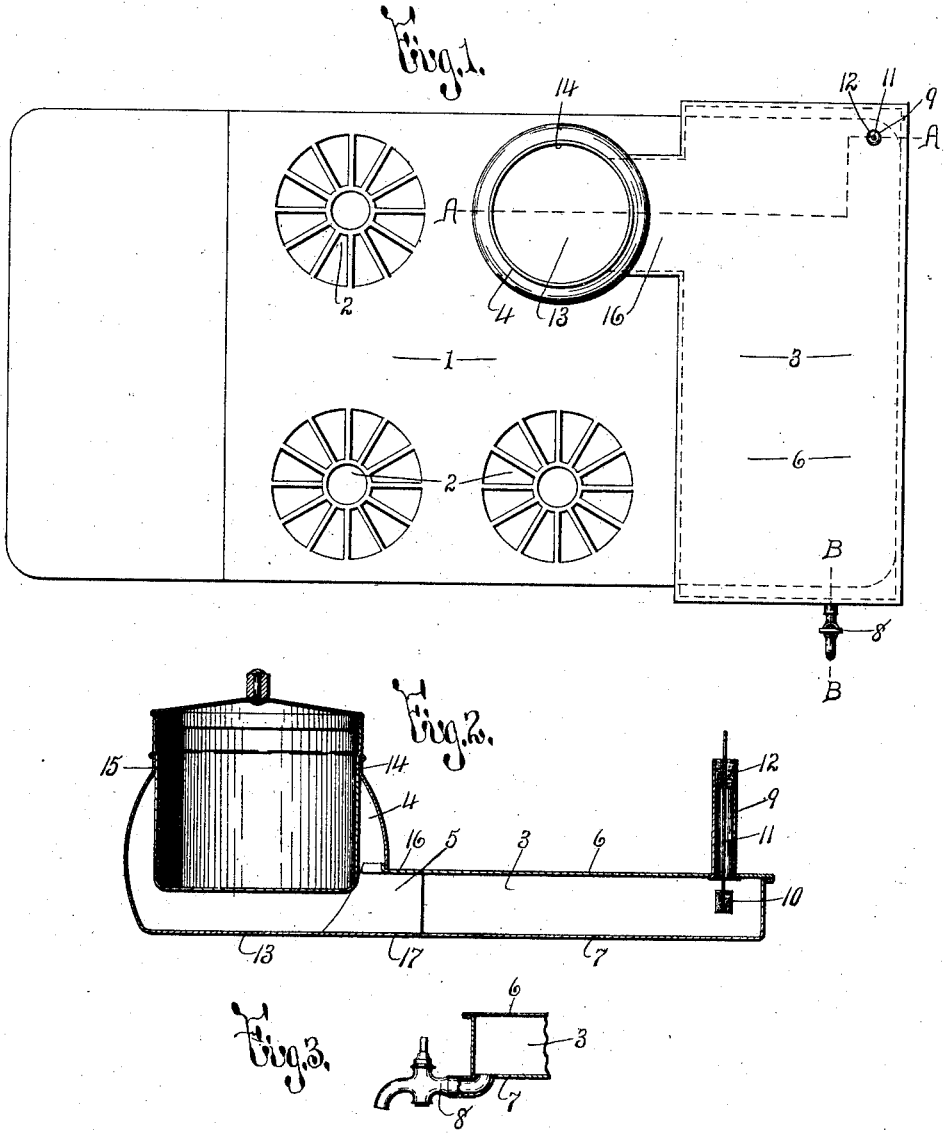
WITNESSES:
Chas. F. Jones
Dora Lainne
INVENTOR
Rosa B. Dickinson
BY
Hey & Parsons
ATTORNEYS

UNITED STATES PATENT OFFICE.

ROSA B. DICKINSON, OF SYRACUSE, NEW YORK.

UTENSIL FOR COOKING-RANGES.

No. 902,215.

Specification of Letters Patent.

Patented Oct. 27, 1908.

Application filed June 22, 1904. Serial No. 213,593.

*To all whom it may concern:*

Be it known that I, ROSA B. DICKINSON, of Syracuse, in the county of Onondaga and State of New York, have invented a certain new and useful Utensil for Cooking-Ranges, of which the following is a specification.

My invention has for its object the production of a utensil for cooking ranges, whereby a maximum amount of heating is accomplished with a minimum quantity of fuel; and it consists in the combinations, constructions and arrangements of the component parts hereinafter set forth and claimed.

In describing this invention, reference is had to the accompanying drawing, in which like characters designate corresponding parts in all the views.

Figure 1 is a top plan of an ordinary gas range with a preferable construction of my utensil in position thereon. Figs. 2 and 3 are sectional views, respectively, on lines A—A and B—B, Fig. 1.

1 is a gas-range having openings 2 in which gas-jets, not shown are disposed. The illustrated construction of my utensil comprises a liquid-containing reservoir 3, a heating-receptacle 4, and a conduit 5. The reservoir 3 is substantially closed, is rectangular in form, and its top 6 and bottom 7 are preferably flat, the top being imperforate and the bottom 7 being provided with an outlet, as a faucet 8. Said reservoir is usually provided with a water gage consisting preferably of a stand-pipe 9 and a float 10 having an upwardly extending stem 11 which moves through an opening formed in a plug 12 arranged at the upper end of said stand-pipe.

As here illustrated, the heating-receptacle 4 is circular in horizontal cross-section, is arranged at one side of one end of the reservoir 3 with its bottom 13 in substantially the same horizontal plane as the bottom 7 of the reservoir 3, projects above the top 6 of said reservoir, and is formed with an opening 14 in its top for receiving a cooking utensil, as 15.

The conduit 5 is here shown as formed with a flat top 16 arranged in the same plane as the top 6 of the reservoir, and with a flat bottom 17 disposed in substantially the same plane as the bottoms 13 and 7 respectively of the heating-receptacle 4 and the reservoir 3.

In use, my utensil is placed upon the range, the heating-receptacle 4 being disposed over one of the jets so that the water in the reservoir and receptacle is heated by a single jet at the same time articles of food are being cooked in the utensil 15, and the reservoir 3 not only serves as a hot water supply but also as a food warmer, the flat top thereof forming a support for articles desired to be kept warm.

The construction and operation of my utensil for cooking ranges will now be readily understood upon reference to the foregoing description and the accompanying drawing, and it will be noted that more or less change may be made in the component parts thereof without departing from the spirit of my invention.

Having thus fully described my invention, what I claim as new and desire to secure by Letters Patent, is:—

A utensil for cooking ranges comprising an elongated reservoir, and a heating-receptacle arranged at one side of one end of the reservoir and communicating therewith, said reservoir having an imperforate flat top and a flat bottom, and the receptacle projecting above the top of the reservoir, substantially as and for the purpose set forth.

In testimony whereof, I have hereunto signed my name in the presence of two attesting witnesses, at Syracuse, in the county of Onondaga, in the State of New York, this 23rd day of May, 1904.

ROSA B. DICKINSON.

Witnesses:
    D. LAVINE,
    S. DAVIS.